United States Patent [19]

Mori et al.

[11] Patent Number: 5,532,782
[45] Date of Patent: Jul. 2, 1996

[54] CAMERA HAVING A DEPTH PRIORITY OPERATION MODE

[75] Inventors: Ryuichi Mori, Kanagawa-ken; Tetsuo Goto, Chiba-ken; Sunao Nishioka, Tokyo, all of Japan

[73] Assignee: Nikon Corporation, Tokyo, Japan

[21] Appl. No.: 376,411

[22] Filed: Jan. 23, 1995

[30] Foreign Application Priority Data

Feb. 17, 1994 [JP] Japan .................................. 6-020189

[51] Int. Cl.⁶ .................................................. G03B 9/02
[52] U.S. Cl. ................. 354/402; 354/195.11; 354/271.1
[58] Field of Search ........................... 354/195.11, 271.1, 354/402

[56] References Cited

U.S. PATENT DOCUMENTS 4,792,819  12/1988  Akashi .
4,827,303  5/1989  Tsuboi .
4,829,331  5/1989  Aihara .
4,982,217  1/1991  Aihara .
5,038,164  8/1991  Harada .

FOREIGN PATENT DOCUMENTS 63-172129  7/1988  Japan .
63-172250  7/1988  Japan .
63-172248  7/1988  Japan .
1-200314  8/1989  Japan .

*Primary Examiner*—Michael L. Gellner
*Assistant Examiner*—D. P. Malley
*Attorney, Agent, or Firm*—Oliff & Berridge

[57] ABSTRACT

A camera having a depth priority operation mode calculates a stop value and perform photography such that multiple objects at different distances all enter into the photographic depth of field. When the calculated stop value is less than the smallest possible stop value of a photographic lens attached to the camera, the photographic lens is driven so that the closest object is placed on the photographic lens side of the focal surface, when the closest object is focused into the photographic depth of field.

19 Claims, 8 Drawing Sheets

CAMERA HAVING A DEPTH PRIORITY OPERATION MODE

BACKGROUND OF THE INVENTION

1. Field of the Invention

This invention is directed to a camera that determines the stop value of a photographic lens based on the focal depth of the object or objects to be photographed.

2. Description of Related Art

When an object at a certain distance is brought into focus prior to being photographed, the resulting photograph is generally focused not only on that particular object, but also on objects in front of and behind the object. When the focus is adjusted to a certain position, there is a range of positions which are actually in focus. This range is called the photographic depth of field. It is known that the photographic depth of field increases as the diaphragm gets smaller. If the distance is fixed, the boundary depth grows larger as the focal length decreases. The term "diaphragm" refers to the F number that is widely used in photography-a larger F number means a diaphragm which is in a relatively more closed state, while a smaller F number means the diaphragm is in a relatively more open state. Furthermore, the photographic depth of field is smaller when the object in focus is at a close distance and is larger when the object is at a greater distance.

The focal depth is in front of and behind the focal surface of the photographic lens. The focal surface is the film surface on which the image of the object will be recorded. The focal depth describes the range in which picture portraits can be clearly photographed (not unfocused). The focal depth is larger on the photographic lens side of the focal surface and is smaller on the opposing (rear cover) side of the focal surface.

As a conventional method of performing photography under conditions in which multiple objects at differing positions, each with a different focus, are to be photographed, the photographer closes the diaphragm while peering through the finder and determines a stop value at which each object is in focus by confirming the state of each object (in other words, a stop value into which each object enters the photographic depth of field).

To obtain the objective stop value by this method, it is necessary for the photographer to be experienced. Amateurs are sometimes unable to perform acceptable photography using this method. In order to solve this type of problem, cameras have recently been introduced which are equipped with a photographic depth of field priority regulation device. Numerous cameras of this type are known, including, for example, the camera disclosed in Japanese unexamined patent application Sho 63-172129.

However, with cameras equipped with conventionally known photographic depth of field priority regulation devices, when multiple objects at differing positions are to be photographed, or when the stop value at which each object can be brought into focus is smaller than the smallest stop value of the lens installed on the camera, it becomes impossible for all of the multiple objects at the different positions to be brought into focus at the same time.

In this state, there are many cases in general in which a photograph that corresponds to the expectations of the photographer is produced by focusing on the object closest to the camera, but this type of correspondence is not made by the conventional camera described above, which causes an inconvenience to photographers.

SUMMARY OF THE INVENTION

This invention therefore provides a camera which resolves the problems stated above.

In particular, this invention provides a camera that determines the stop value for a state in which multiple objects are in focus.

Additionally, this invention provides a camera that focuses on the object closest to the camera when the determined stop value is less than the smallest stop value for the lens attached to the camera.

Further, this invention provides a camera that performs photography in which even the farthest objects are at the optimum focus state.

According to this invention, a stop value can be calculated and photography performed, such that multiple objects to be photographed are all within the photographic depth of field. Furthermore, when the calculated stop value is less than the smallest stop value of the photographic lens, the photographic lens can be driven to a point on the photographic lens side from the focal surface where the object to be photographed is automatically focused and at which the focal surface comes within the range of the focal depth. Thus, even when multiple objects are photographed, an optimal photographed can always be obtained.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
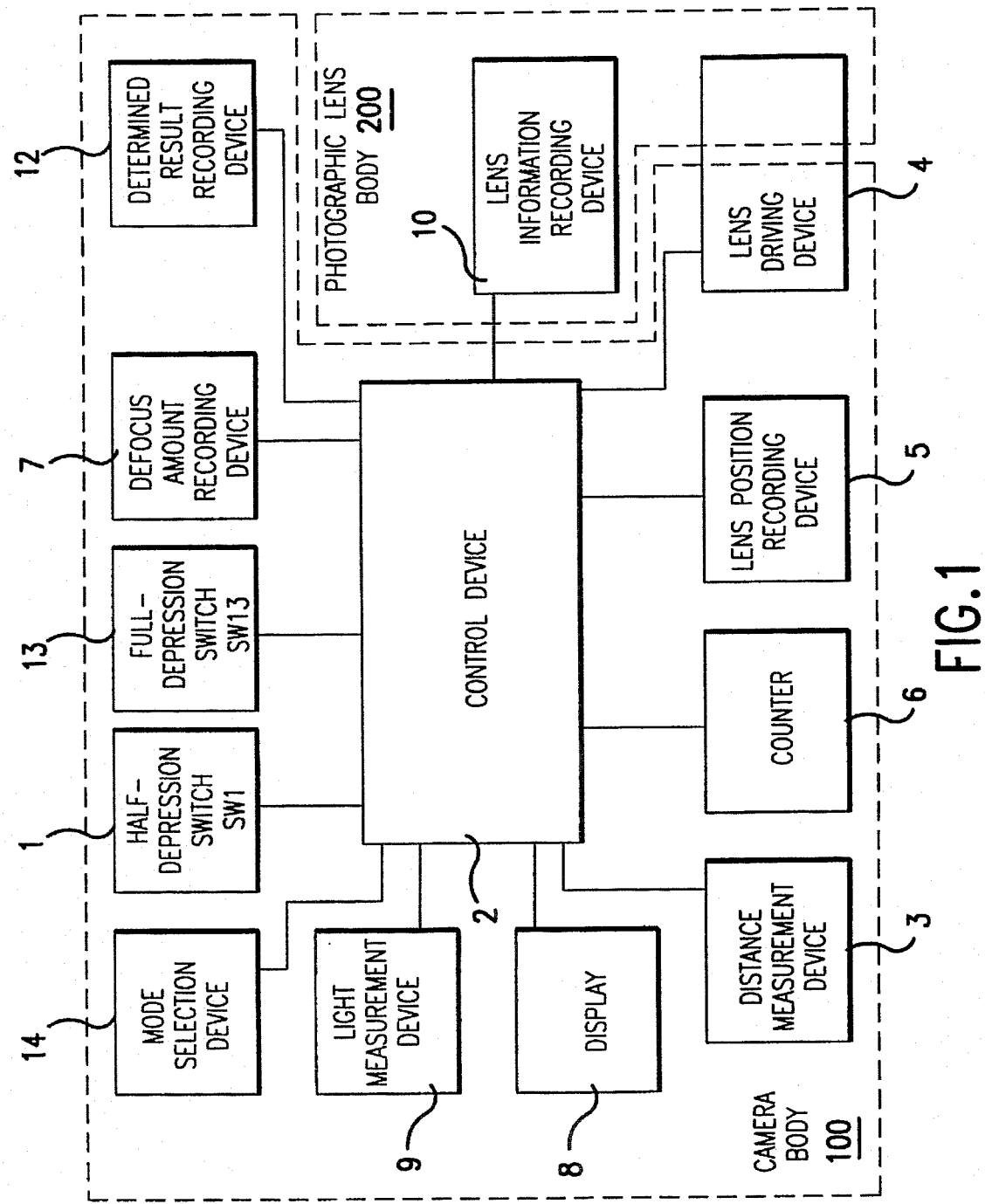
FIG. 1 is a block diagram of a preferred embodiment of the camera of this invention.
Figure 3:
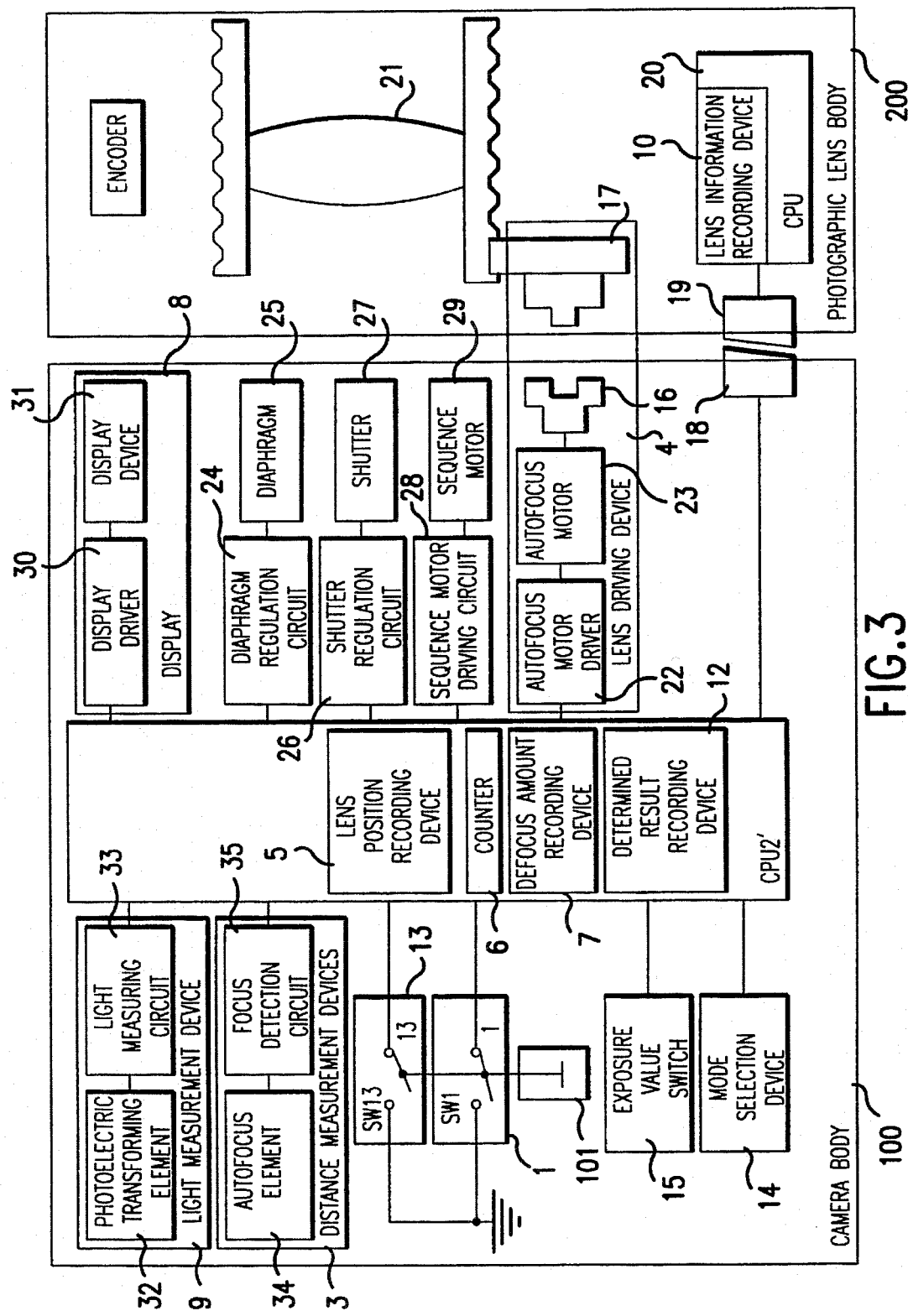
FIG. 3 is a circuit diagram of the preferred embodiment shown in FIG. 1.
Figure 4A:
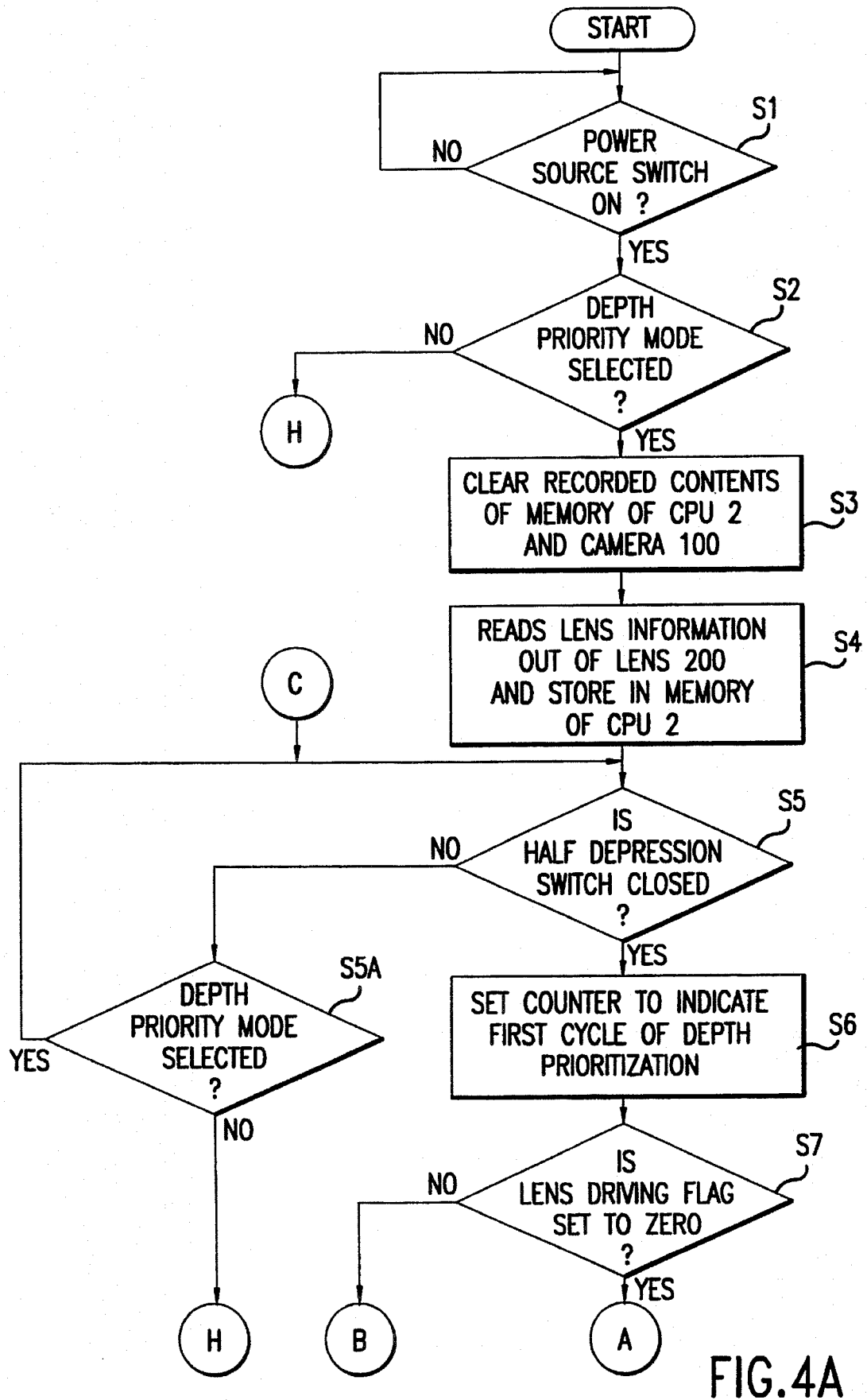
FIGS. 4A–4E is a flow chart outlining the operation of the preferred embodiment shown in FIG. 1.
Figure 4B:
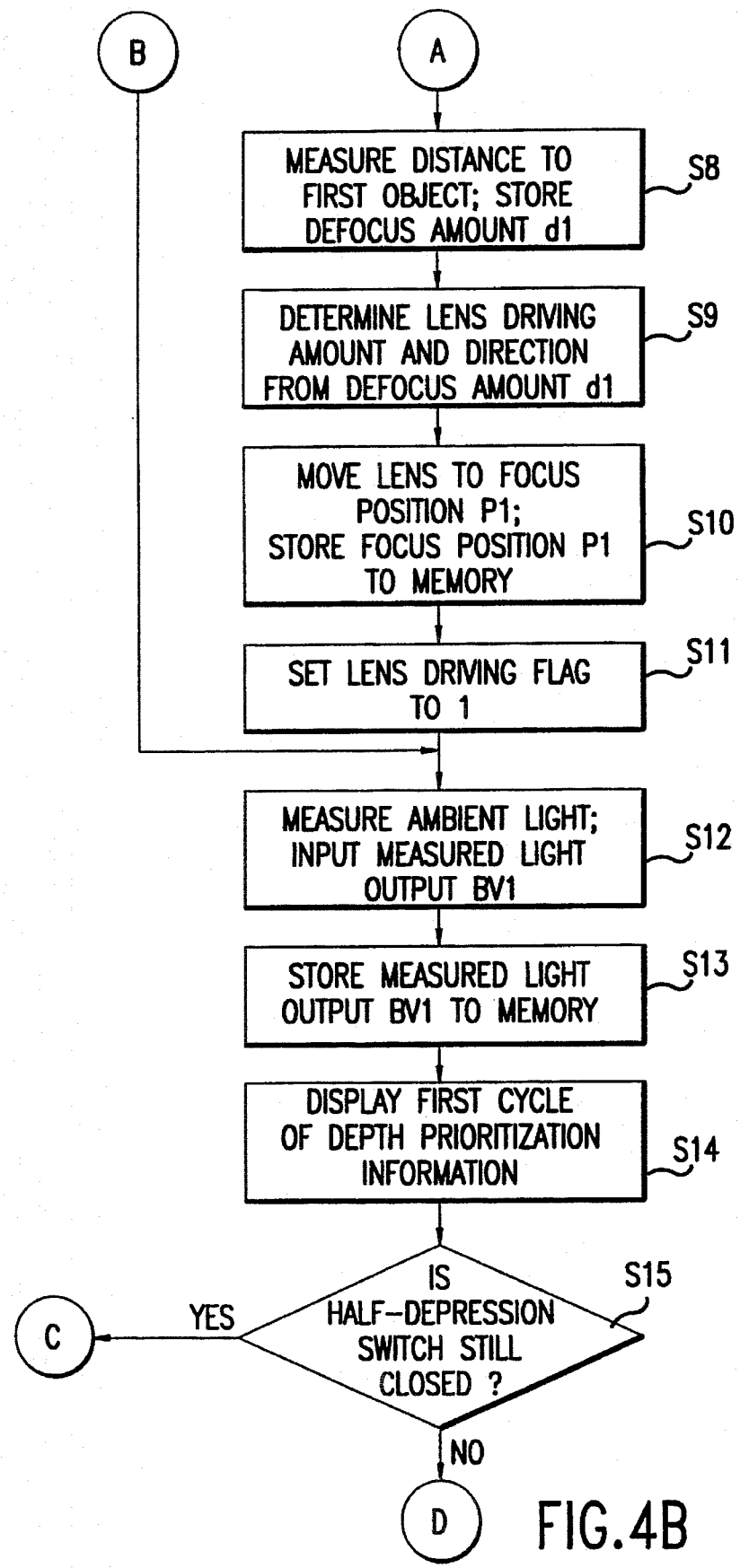
Figure 4C:
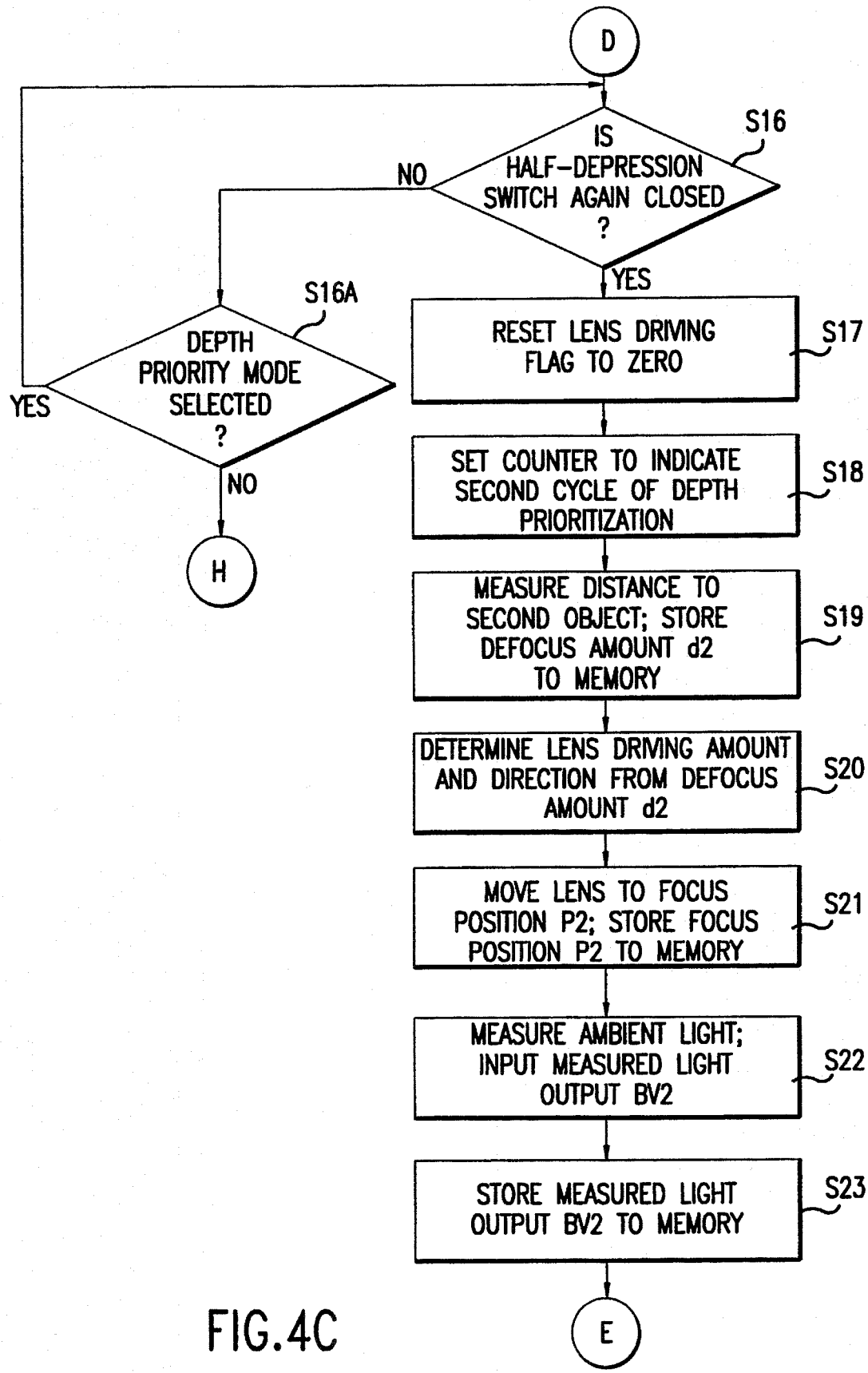
Figure 4D:
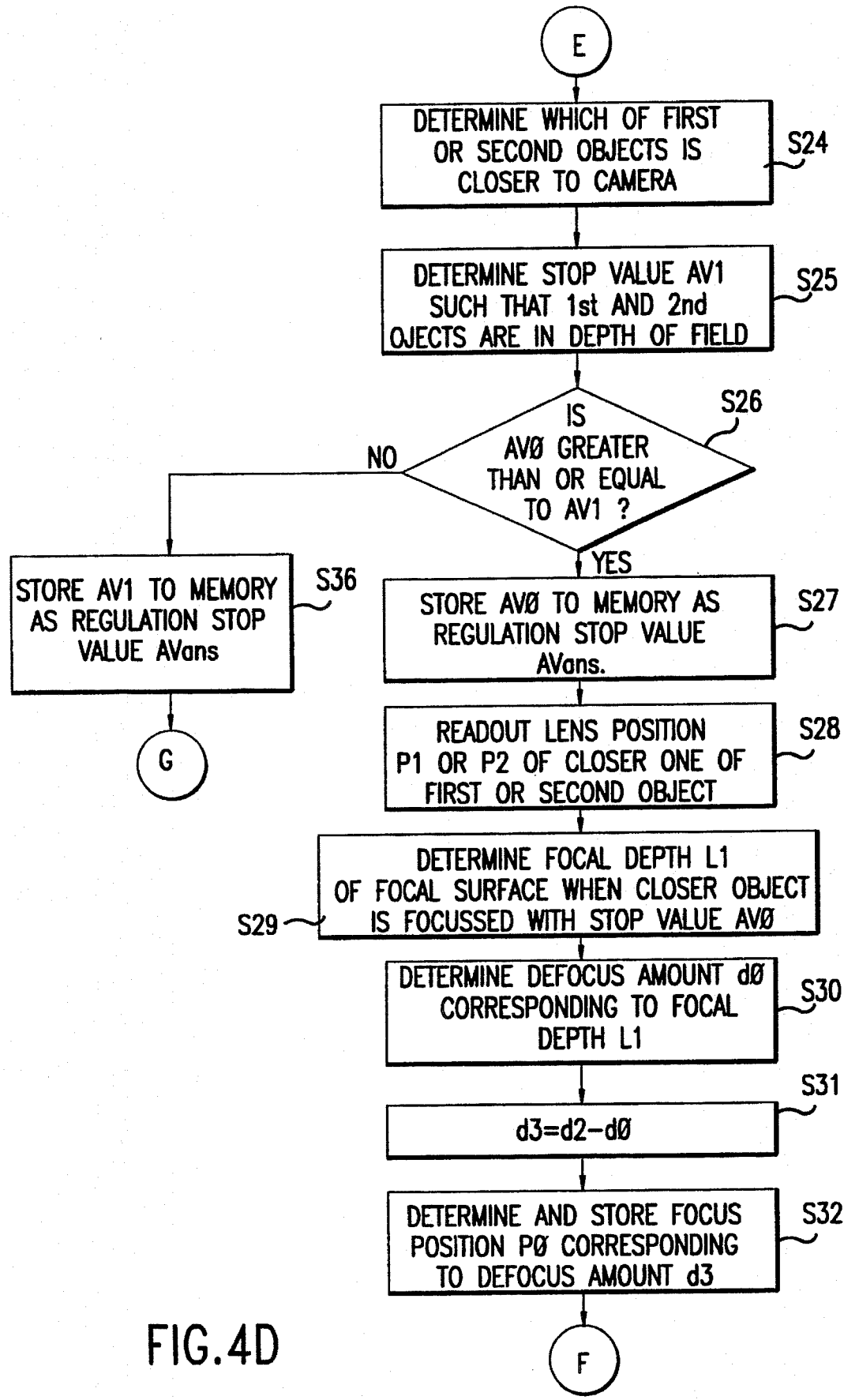
Figure 4E:
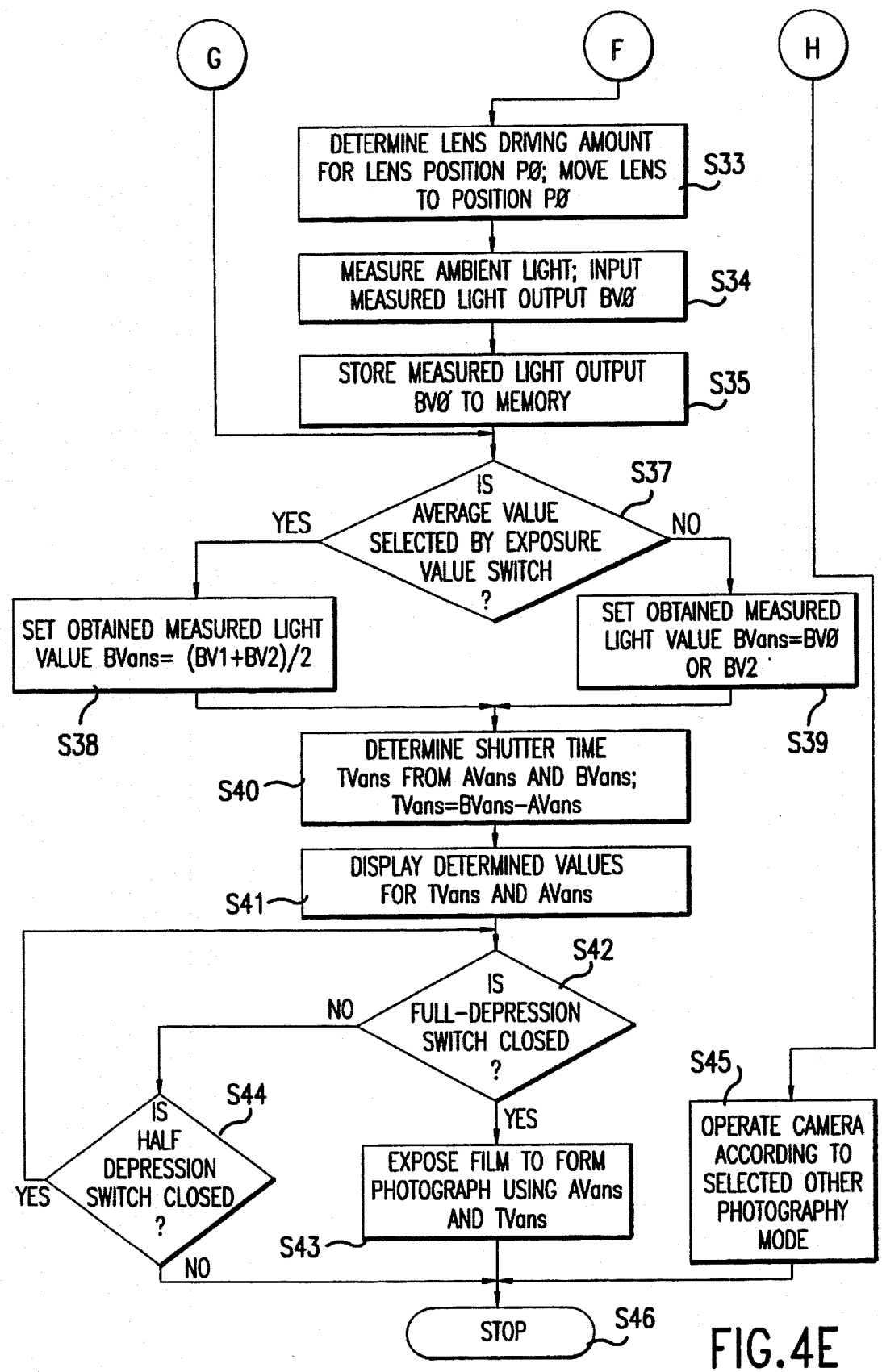

As shown in FIG. 1, the preferred embodiment of the camera of this invention includes a control device 2 provided in a camera body 100. A half-depression switch 1, a distance measuring device 3, a lens driving device 4, a display 8, a light measuring device 9, a full-depression switch 13, and a mode selecting device 14 are each provided in the camera body 100 and connected to the control device 2. The control device 2 is also connected to a lens information recording device 10, which is provided within the control device 20 (shown in FIG. 3) associated with the photographic lens body 200, making communication possible between the lens information device 10 and the control device 2. A lens position recording device 5, a counter 6, and defocus amount recording device 7 are also connected to the control device 2. The control device 2 is preferably a microcomputer CPU 2', as shown in FIG. 3.

The mode selection device 14 selects or deselects the photographic depth of field priority photography mode which is referred to hereafter simply as "the depth priority mode". The depths priority mode is selected when the photographer wishes to photograph multiple objects that are at different distances from the camera body 100, such that all of the objects are in focus. When the photographer selects the depth priority mode, photography is carried out according to the following procedure.

Figure 2:
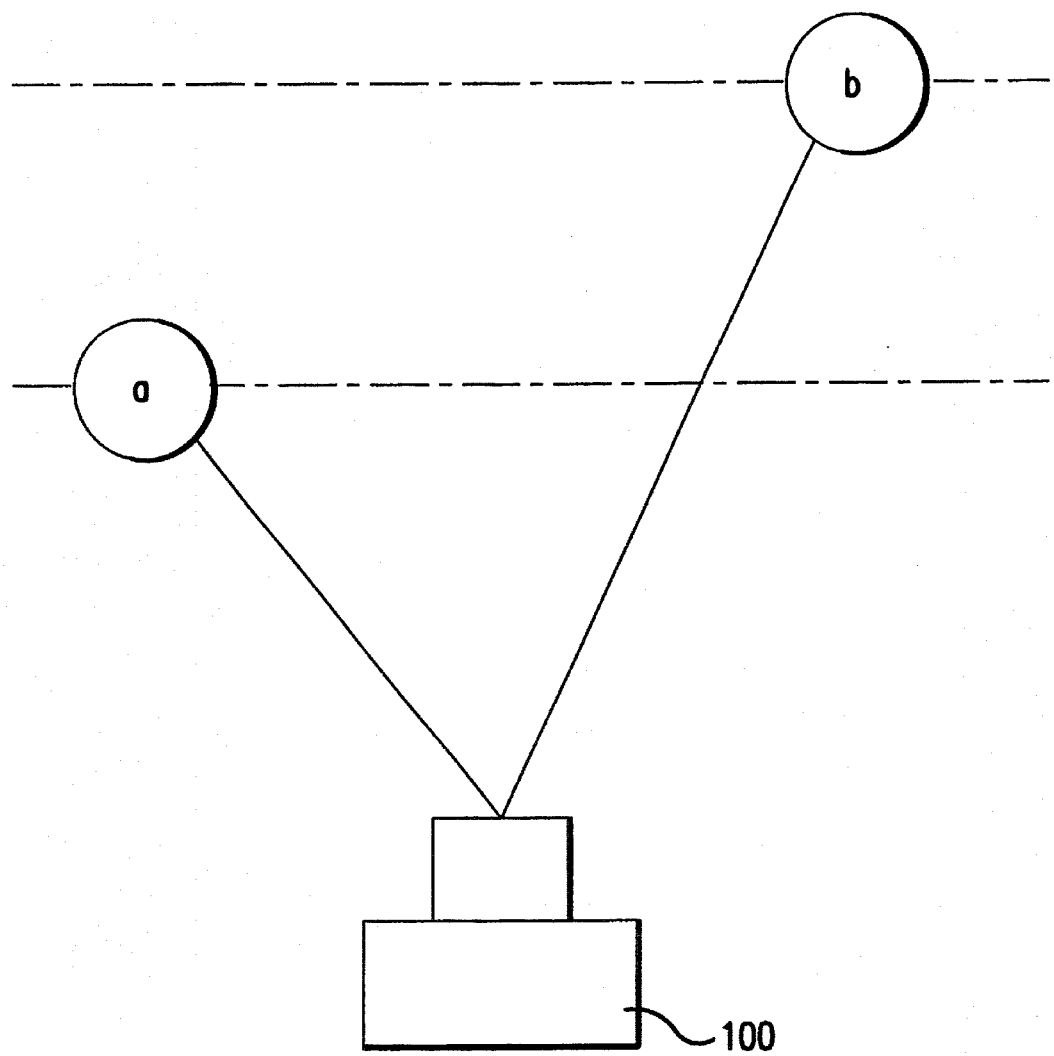
FIG. 2 shows the operation of the embodiment shown in FIG. 1.

First, the object "a", as shown in FIG. 2, is selected as the object from which the distance to the camera will be measured, and the half-depression switch 1 is closed by depressing a release button 101 (shown in FIG. 3) provided on the camera body 100 to a closed first position, completing one cycle of the depth priority operation. The light measuring device 9 is turned on by closing the half-depression switch 1, and light measurement is accomplished. Then, the control device 2 causes the distance measuring device 3 to measure the distance to object "a". A signal is output to the lens driving device 4, and the photographic lens 21 is driven to a first focus position P1. At this point, the lens position is recorded in the lens position recording device 5. The counter 6 records this position as the first cycle of depth prioritization.

The photographer opens the half-depression switch 1 by releasing the release button 101. An object "b" is then selected as the object from which the distance will now be measured. The half-depression switch I is again closed by depressing the release button 101 to the first position, completing two cycles of depth prioritization. Following this operation, the control device 2 causes the distance measuring device 3 to measure the distance to the object "b". The control device 2 then determines the defocus value of the surface of object "b," and stores this value in the defocus value recording device 7. The counter 6 records this as the second cycle of depth prioritization. The control device 2 also determines which one of the objects "a" and "b" is closer, by analyzing the defocus amount. The determined result is recorded in the determined result recording device 12. As shown in FIG. 2, in the example used herein, the object "a" from the first depth prioritization cycle is closer.

The control device 2 next reads out the defocus amount stored in the defocus amount recording device 7, divides the defocus amount by a degree of uncertainty of 0.033 mm, then determines a stop value at which both objects "a" and "b" will enter into the photographic depth of field, which is then recorded. The information relating to the smallest stop value of the photographic lens, which is stored in advance in the lens information recording device 10 positioned within the CPU 20 of the photographic lens body 200, is read out and displayed on the display 8, the smallest stop value and the stop value obtained from the calculated result then being compared.

The smallest stop value corresponds to the aperture of the diaphragm being as small as possible. At this point, the F number is the largest.

Since the following operations differ based on the relative values of the stop value and the smallest stop value, each case is described. In the first case, in which the obtained stop value is larger than the smallest stop value, the control device 2 determines the shutter time, in seconds, from the light measuring information taken from the light measuring device 9 during the first or second cycle of depth prioritization and from the determined stop value. The shutter time, in seconds, and the stop value are then displayed on the display 8.

The full depression switch 13 is closed when the release button 101 is depressed to a second position, and the film is exposed to create a photograph. At this point, the photographic lens 21 is driven to a position at which the closest object is in focus.

In the second case, in which the determined stop value obtained is determined, based on the results of the comparison described above, to be smaller than the smallest stop value, the control device 2 determines the photographic depth of field range of the closest object (object "a" in FIG. 2) at the smallest stop value. The lens driving device 4 is then within the photographic depth of field range of the closest object, and the photographic lens 21 is driven to a position that focuses at a farther distance than this closest object.

The control device 2 then determines the shutter time in seconds from the light measuring information taken from the light measuring device 9 during the first or second cycle Of depth prioritization and from the determined stop value. The shutter time, in seconds, and the stop value are then displayed on the display 8. The full depression switch 13 is closed when the release button 101 is depressed to the second position and the film is exposed to form a photograph.

In the above description, although the lens 21 is not driven during the second cycle of the depth prioritization, it should be appreciated that the lens 21 could be driven if necessary to focus it. In addition, it is obvious that even if the distance to the object "b" is measured at the first cycle of depth prioritization and the distance to object "a" is measured at the second cycle of depth prioritization, the same end result will be obtained.

Also, in the preferred embodiment, the light measuring device 9 is turned on when the release button 101 is depressed to the first position. Of course, the light measuring device 9 may also be turned on by an auto-exposure (AE) lock button that is provided separately.

As shown in the more detailed circuit diagram of FIG. 3, the light measuring device 9 comprises an AE (auto-exposure) element, such as a photoelectric transforming element 32 (photoelectric transforming means) such as a silicon photodiode (SPD) or the like, and an amplifier (AMP), which is a light measuring circuit 33 that transforms the output from the photoelectric transforming means 32 from analog to digital form and then outputs the digital data to the CPU 2.

The distance measuring device 3 comprises an AF (autofocus) element 34 which is formed by a photoelectric transforming element, such as a CCD (charge-coupled device) or the like, that receives light from the object to be photographed that has come through the lens, and an autofocus detection circuit, controller or computer (AFCOM) 35 which determines the defocus amount based on the output from the AF element 34.

The exposure value (EV) switch 15 determines whether the measured light value in the depth priority mode will be: 1) determined as the average of the first and second cycles of depth prioritization; or 2) set to the most recently measured value. According to the state of the EV switch 15, the exposure value at the time the film is exposed will be determined either from the average value of the measured light values of the first and second cycles of depth prioritization or from the most recently measured light value. The method for determining the measured light values can be any known method.

The mode selection device 14 acts as a depth priority mode selection switch for selecting or deselecting the depth priority mode.

The display 8 comprises a display device 31 that is constructed using an LCD, an array of LEDs, an electrochromic or electro-chrominessence (EC) element, or the like, and a display driver 30 for driving the display device 31.

The lens driving device 4 comprises an AF motor (AFMT) 23 driving a transmission coupling 16, an AF motor driver 22 that drives the AF motor 23 according to the determined light measuring value. The AF motor 23 is positioned within the camera body 100. The camera body coupling 16 mates, when the lens body 200 is attached to the camera body 100, with a lens body coupling 17. The lens body coupling 17 is engaged with a gear portion of the lens 21 to move the lens 21 within the lens body 200 along the optical axis of the lens system.

A diaphragm regulation circuit 24, which regulates the diaphragm 25, and a Shutter regulation circuit 26, which regulates the shutter 27, are also connected to the CPU 2'. The diaphragm regulation circuit 24 controls the diaphragm 25, based on a signal from the CPU 2', so that the diaphragm aperture of the diaphragm 25 is set to a determined radius. The shutter regulation circuit 26 opens and closes the shutter 27 based on the shutter time, in seconds, output from the CPU 2'.

Furthermore, a sequence motor driving circuit 28, which drives a sequence motor 29 that performs film winding, rewinding, mirror up, shutter charge, and the like, is connected to the CPU 2'.

The above descriptions are all descriptions that relate to the camera body 100 of the invention. Hereafter, the descriptions will deal with the photographic lens body 200 attached to the camera body 100.

The focus adjusting lens 21, which is a part of the photographic lens, is driven forward and backward along the optical axis of the lens by the driving force of the autofocus motor 23 transmitted through the transmission coupling 16 in the camera body 100 and the transmission coupling 17 provided in the photographic lens body 200. A distance encoder 37 detects the position of the focus adjusting lens 21, as the focus adjusting lens 21 is driven by the transmission coupling 17.

The lens driving device 4 of FIG. I includes the AF motor 23, the AF motor drive circuit 22, and the coupling 16, which are positioned in the camera body 100, and the coupling 17 which is positioned in the photographic lens body 200. In FIG. 3, information communication between the camera body CPU 2' and the photographic lens body CPU 20 is carried out via a connection component 19 that comprises multiple connection points.

The CPU 2' within the camera body 100 and the CPU 20 within the photographic lens body 200 carry out information communication through a connection component 18, which comprises multiple connection points positioned within the camera body 100, and the connection component 19, which comprises multiple connection points positioned in the photographic lens body 200 which correspond to the connection points of the connection component 18.

The operation of the control device 2 shown in FIG. 1 is shown in the flow charts of FIGS. 4A–4E. In step S1, the power source switch (not shown) being turned on is detected. When the power source switch is detected to be on, control proceeds to step S2. Otherwise, control loops back to step S1. In step S2, the mode selected by the mode switching device 14 is determined. If the depth priority mode has been selected, control proceeds to step S3.

Otherwise, if the depth priority mode has not been selected (i.e. some other photography mode has been selected), control jumps to step S45. In step S45, the control sequence for operating the camera according to the selected other photography mode is performed. Once the photograph is exposed using the selected other photography mode, control continues to step S46, where the camera operation process stops.

In step S3, the recorded contents in the memory of the CPU 2'(i.e., the recorded contents of the lens position recording device 5, the defocus amount recording device 7, the counter 6, the determination result recording device 12, the lens information, and the lens driving flag) are cleared, and control proceeds to step S4. In step S4, the lens information, which includes the smallest stop value AVO which has been already recorded in the lens information recording device 10 within the photographic lens body 200, is stored in the memory of the CPU 2'.

In step S5, the state of the half-depression switch 1 is determined. If the half-depression switch 1 is closed, control proceeds to step S6. Otherwise, control jumps to step S5A. In step S5A, the selected photography mode is rechecked. If the selected photograph mode remains the depth priority mode, control jumps back to step S5. Otherwise, if the selected photography mode is some other photography mode, control jumps to step S45, where the camera is operated according to the selected other photography mode instead.

In step S6, the counter 6 is set to indicate that this is the first cycle of depth prioritization. In step S7, the lens driving flag is evaluated. If lens driving has been performed since the lens driving flag was cleared in step S3, the lens driving flag is set to 1; if lens driving has not been performed, the lens driving flag remains set to 0. If the lens driving flag is set to 0, control proceeds to step S8. Otherwise, if the lens driving flag is set to 1, control proceeds to step S12. In the first pass through step S7, since the flag was cleared in step S3, control proceeds to step S8 because lens driving has not been performed.

In step S8, the distance to the first object is measured by the distance measuring device 3, and the defocus amount d1 relating to the first object image is stored in the defocus amount storage device 7. In step S9, the lens driving amount and driving direction are determined from the defocus amount d1 obtained in step S8. In step S10, the result is output to the AF lens driving circuit 4, causing the AF lens driving motor 23 to move the movable lens 21 to a focus position P1 for the first object. The lens position P1 to which the lens 21 is driven is recorded in the lens position recording device 5. In step S11, the lens driving flag is set to 1.

In step S12, the ambient light is measured by the light measuring device 9, and the measured light output BV1 is input into the CPU via the A/D light measuring circuit 33. In step S13, the measured light output BV1 is stored in the memory within the CPU 2'. In step S14, the first cycle depth prioritization information recorded in step S6 is displayed on the display 8.

In step S15, the state of the half-depression switch 1 is again determined. If switch 1 is on, control returns to step S5. In the second or subsequent pass through step S7, since the lens driving flag is set to 1, the lens driving has already been performed. Thus, control proceeds from step S7 directly to step S12. In step S12, the measured light output BV1 is again stored in the memory within the CPU. Steps S5–S7 and S12–S15 are then repeated until the half-depression switch 1 is open in step S15. In this case, control proceeds to step S16.

In step S16, the state of the half-depression switch 1 is again determined. When the half-depression switch 1 is on, control proceeds to step S17. Otherwise, control jumps to step S16A. In step S16A, the selected photography mode is rechecked. If the selected photograph mode remains the depth priority mode, control jumps back to step S16. Otherwise, if the selected photography mode is some other photography mode, control jumps to step S45, where the camera is operated according to the selected other photography mode instead.

In step S17, the lens driving flag is reset to 0. In step S18, the counter 6 is set to indicate that this is the second cycle of depth prioritization. In step S19, the distance measuring circuit 3 measures the distance to the second object, determines the defocus amount d2 relating to the second object, and outputs the defocus amount d2 to the CPU 2'. In step S20, the lens driving amount and driving direction are determined from the defocus value d2 obtained in step S19, and the determined result is output to the AF lens driving circuit 4. In step S21, the AF lens driving motor 23 is driven, the movable lens 21 is moved to the focused position P2 for the second object and the lens position P2 to which the lens 21 was driven in step S20 is recorded in the memory within the CPU 2'.

In step S22, the ambient light is measured by the light measuring device 9, and the measured light output BV2 is input into the CPU via the A/D light measuring circuit 33. In step S23, the measured light output BV2 input in step S22 is recorded in the memory within the CPU 2'.

In step S24, the first object or the second object is determined to be closer based on the defocus amount d2. The result is recorded in a built-in memory. In step S25, a stop value AV1 at which both the first and second objects will be within the photographic depth of field is determined from the defocus value d2 and the lens information read in step S4 and recorded in a built-in memory.

In step S26, the determined stop value AV1 determined in step S25 and the smallest stop value AV0 read out in step S4 are compared. If AV0 is greater than or equal to AV1, control continues to step S27. Otherwise, if AV0 is not larger than AV1, control jumps to step S36. Thus, if the determined stop value AV1 is larger than the smallest stop value AV0, then the determined stop value AV1 is selected as the regulation stop value AVans. In step S36, the determined step value AV1 is thus recorded in the built-in memory, and proceeds to step S37.

If the determined stop value AV1 is smaller than the smallest step value AV0, the smallest stop value AV0 is selected as the regulation stop value AVans. Thus, in step S27, the smallest stop value AV0 is stored to memory as the regulation stop value AVans and control proceeds to step S28.

Alternately, in a second embodiment of step S26, if the determined stop value AV1 is substantially equal to or larger than the smallest stop value AV0, then the determined stop value AV1 is selected as the regulation stop value AVans, while if the determined stop value AV1 is not substantially equal to and less than the smallest stop value AV0 is the smallest stop value AV0 selected as the regulation stop value AVans.

In step S28, the lens position is read out for the object determined in step S24 to be the closest. For example, supposed that object "a" of the first cycle of depth prioritization is the closest object, and the lens position P1 is the lens portion that is read out.

In step S29, the focal depth of the focal surface when object "a" is brought into focus at the smallest stop value AV0 is determined. As described above, the focal depth is in front of and behind the focal surface of the photographic lens, where the focal surface is coplanar with the film surface, and describes the range in which picture portraits can be clearly (i.e., not unfocused) photographed. The focal depth mentioned here is a portion L1 of the focal depth on the photographic lens side of the focal surface. The photographic lens side of the focal surface corresponds to the far side of the closest object "a".

In step S30, a defocus amount d0 corresponding to the focal depth L1 is determined. Next, in step S31, a defocus amount d3 is determined by subtracting the defocus amount d0 from the defocus amount d2. Then, in step S32, a lens position P0 is determined for when the photographic lens has moved the amount corresponding to defocus value d3. The lens position P0 is recorded in the memory within the CPU. While the lens position P0 is determined, it is not always necessary to determine this value.

In step S33, the lens driving amount is determined from the defocus amount d3 obtained in step S28. The lens driving amount is output to the AF lens driving circuit 4, the AF lens driving motor 23 is driven, and the movable lens 21 is moved to the lens position P0.

In step S34, the ambient light is measured by the light measuring device 9, and the measured light output BV0 is input into the CPU via the A/D light measuring circuit 33. In step S35, the measured light output BV0 input in step S30 is recorded in the memory within the CPU 2'. In step S37, an average value or a most recent value for the measured light value is determined based on the state of the exposure value EV switch. If the average value is selected, control proceeds to step S38; otherwise, if the most recent value is selected, control proceeds to step S39.

In step S38, the measured light output BV1 of the first cycle of depth prioritization and the measured light output BV2 of the second cycle of depth prioritization are averaged, the obtained measured light value BVans being stored in the interior memory. In contrast, in step S39, the output BV0 (or BV2) corresponding to the last lens position P0 or (P2) is stored in the interior memory as the measured light value BVans. That is, when control jumps directly from step S26 to step S36, the last measured light value is BV2. Thus, in that case, the measured light output BV2 that corresponds to the lens position P2 is stored in the interior memory as the measured light value BVans. In contrast, when control continued from step S26 to step S27, the last measured light value is BV0. Thus, in this case, the measured light value BV0 that corresponds to the lens position P0 is stored in the interior memory as the measured light value BVans.

Then, both steps S38 and S39 continue to step S40. In step S40, the shutter time TVans is determined from the regulation step value AVans obtained in step S26 and the measured light value BVans obtained in step S38 or S39. In step S41, the regulation stop value AVans and shutter time TVans are displayed on the display 8 in a form which the photographer can evaluate. For example, the regulation stop value AVans is displayed as an F number and the shutter time TVans is displayed in units of seconds.

In step S42, the state of the full depression switch 13 is determined. When the full-depression switch 13 is closed, control proceeds to step S43. In step S43, the camera is operated based on the regulation stop value AVans, the shutter time TVans and the selected lens position to expose the film to form a photograph. Then, in step S45, the process ends.

However, if in step S42, the full-depression switch 13 is not closed (by not fully depressing the release button 101) control jumps to step S44. In step S44, the state of the half depression switch 1 is checked. If the half depression switch 1 remains closed, control jumps back to step S42. However, if in step S44, the half depression switch 1 is also not closed (i.e., open), meaning the photographer has completely released the release button 101, then no photograph is to be taken, and control jumps directly to the stop step S45, bypassing the photograph-taking step S43.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera having a depth priority operation mode for simultaneously photographing a plurality of objects and a focal surface having a lens side and a rear cover side, the camera comprising:

lens means attached to the camera;

lens information means for storing lens information in the lens means, the lens information including a smallest stop value obtainable with the lens means;

drive means for moving the lens means to a desired position relative to the focal surface of the camera;

focus detection means for determining focus information for each one of the plurality of objects;

memory means for storing the focus information for the plurality of objects;

stop value determining means for determining a determined stop value for the lens means based on the focus information for the plurality of objects;

stop value selecting means for selecting a larger one of the smallest stop value and the determined stop value as the actual stop value;

focal depth determining means for determining a focal depth of field of the lens means based on the selected stop value; and control means for controlling the drive means, wherein, when the smallest stop value is selected, the control means moves the lens means to focus a closest one of the plurality of objects within the focal depth and on the lens side of the focal surface of the camera.

2. The camera of claim 1, wherein the focus information for each object includes at least one of a focus position of the lens means and a defocus amount.

3. The camera of claim 2, wherein the stop value determining means comprises:

means for determining a closest one of the plurality of objects which is closest to the camera based on the defocus amounts of the plurality of objects; and stop value generating means for generating the determined stop value based on the defocus amounts and the lens information, wherein when the camera is set to the determined stop value, the plurality of objects will be within the focal depth of field.

4. The camera of claim 3, wherein the control means comprises:

means for determining a focal depth portion of the focal depth of field on the lens side;

defocus amount determining means for determining a focal depth portion, a defocus amount corresponding to the focal depth portion, and a second defocus amount corresponding to a difference between the focal depth portion and a defocus amount corresponding to a non-closest one of the plurality of objects; and lens position determining means for determining a second lens position corresponding to the second defocus amount;

wherein the lens means is moved to the second lens position by the drive means to focus the closest one of the plurality of objects.

5. The camera of claim 1, further comprising:

light measuring means for measuring a light amount at each lens position corresponding to the plurality of objects and the second lens position;

exposure mode selecting means for selecting an exposure mode; and means for determining a measured light output based on the selected exposure mode and the measured light amounts.

6. The camera of claim 5, further comprising shutter timing means for determining shutter timing based on the measured light output and the selected stop value.

7. The camera of claim 5, wherein the exposure mode selecting means selects between a last measured light amount mode and an average light amount mode.

8. A camera having a depth priority operation mode for simultaneously photographing a plurality of objects and a focal surface having a lens side and a rear cover side, the camera comprising:

a lens device attached to the camera, the lens device having a movable lens;

a lens drive device connected to the movable lens;

a lens information storage device storing lens information including a smallest stop value for the lens device;

a focus detector detecting focus information for each of the plurality of objects;

a storage device capable of storing the focus information;

a stop value generator generating a determined stop value for the lens device based on the focus information stored in the storage device;

a comparator comparing the smallest stop value with the determined stop value and outputting the larger of the stop values; and a controller operating the drive device to move the movable lens to a desired position, wherein, when the comparator outputs the smallest stop value, the controller moves the movable lens to focus a closest one of the plurality of objects within a focal field of depth of the camera on the lens side of the focal surface.

9. The camera of claim 8, wherein the focus information for each object includes at least one of a focus position of the lens device and a defocus amount.

10. The camera of claim 9, wherein the stop value generator comprises:

means for determining a closest one of the plurality of objects which is closest to the camera based on the defocus amounts of the plurality of objects; and stop value generating means for generating the determined stop value based on the defocus amounts and the lens information, wherein the camera is set to the determined stop value, the plurality of objects will be within the focal depth of field.

11. The camera of claim 10, wherein the controller comprises:

means for determining a focal depth portion of the focal depth of field on the lens side;

defocus amount determining means for determining a focal depth portion, a defocus amount corresponding to the focal depth portion, and a second defocus amount corresponding to a difference between the focal depth portion and a defocus amount corresponding to a non-closest one of the plurality of objects; and lens position determining means for determining a second lens position corresponding to the second defocus amount;

wherein the lens device is moved to the second lens position by the lens drive device to focus the closest one of the plurality of objects.

12. The camera of claim 8, further comprising:

a light detector measuring a light amount at each lens position corresponding to the plurality of objects and the second lens position;

an exposure mode selector selecting an exposure mode; and means for determining a measured light output based on the selected exposure mode and the measured light amounts.

13. The camera of claim 12, further comprising a shutter timer determining shutter timing based on the measured light output and the selected stop value.

14. The camera of claim 12, wherein the exposure mode selector selects between a last measured light amount mode and an average light amount mode.

15. A method for operating a camera in a depth priority mode for photographing a plurality of objects, the camera having a lens means having a smallest stop value, a focal surface having a lens side and a rear cover side, and a lens driving means, the method comprising the steps of:

(a) selecting a current one of the plurality of objects;

(b) determining a current defocus amount for the current object;

(c) moving the lens means to a current focus position for the current object based on the current defocus amount;

(d) measuring a light amount for the current focus position;

(e) storing the defocus amount light amount and focus position for the current object;

(f) repeating steps (a)–(e) for each one of the plurality of objects;

(g) determining a closest one of the plurality of objects which is closest to the camera;

(h) determining a determined stop value wherein all of the plurality of objects are within a focal field of depth of the camera;

(i) determining if the smallest stop value is larger than the determined stop value;

(j) selecting, if the smallest stop value is larger than the determined stop value, the smallest stop value as a selected stop value;

(k) selecting, if the smallest stop value is not larger than the determined stop value, the determined stop value as the selected stop value; and (l) moving the lens means to focus the closest object within a focal depth of field on the lens side of the focal surface, the focal depth of field based on the selected stop value.

16. The method of claim 15, wherein the smallest stop value selecting step further comprises the steps of:

recalling the lens focus position for the closest one of the plurality of objects;

determining the focal depth of field on the lens side of the focal surface when the closest object is focused with the selected stop value;

determining a lens defocus amount for the determined lens side focal depth;

determining a group defocus amount based on the lens defocus amount and a defocus amount corresponding to a non-closest one of the plurality of objects;

determining a group focus position based on the group defocus amount;

moving the lens means to the group focus position;

measuring the light amount for the group focus position; and storing the group defocus amount, the light amount and the group focus position.

17. The method of claim 15, further comprising the steps of:

determining which one of an average exposure mode and a last exposure mode is selected;

setting an obtained measured light value as an average of the measured light values for the plurality of objects when the average exposure mode is selected;

setting the obtained measured light amount to a last measured light amount when the last exposure mode is selected; and determining a shutter exposure time based on the obtained measured light amount and the selected stop value.

18. A camera having a depth priority operation mode for simultaneously photographing a plurality of objects and a focal surface having a lens side and a rear cover side, the camera comprising:

lens means attached to the camera;

lens information means for storing lens information in the lens means, the lens information including a smallest stop value obtainable with the lens means;

drive means for moving the lens means to a desired position relative to the focal surface of the camera;

focus detection means for determining focus information for each one of the plurality of objects;

memory means for storing the focus information for the plurality of objects;

stop value determining means for determining a determined stop value for the lens means based on the focus information for the plurality of objects;

stop value selecting means for selecting a larger one of the smallest stop value and the determined stop value as the actual stop value; and control means for controlling the drive means, wherein, when the smallest stop value is selected, the control means moves the lens means to focus a closest one of the plurality of objects.

19. The camera of claim 18, wherein, when the determined stop value is substantially equal to the smallest stop value, the stop value selecting means selects the determined stop value as the actual stop value.

* * * * *